Dec. 24, 1940.  R. F. RUNGE ET AL  2,226,524
MEANS FOR SECURING A BEARING TO A SHAFT
Filed Nov. 21, 1939
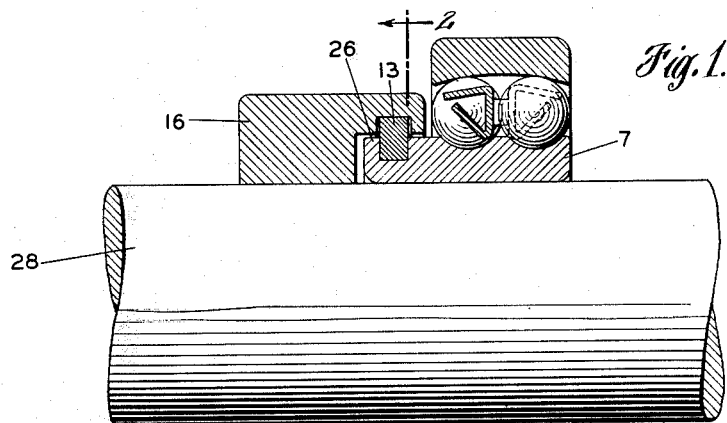
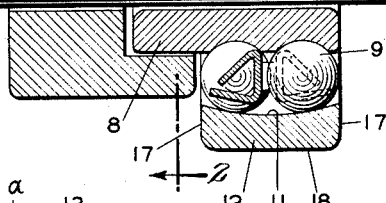
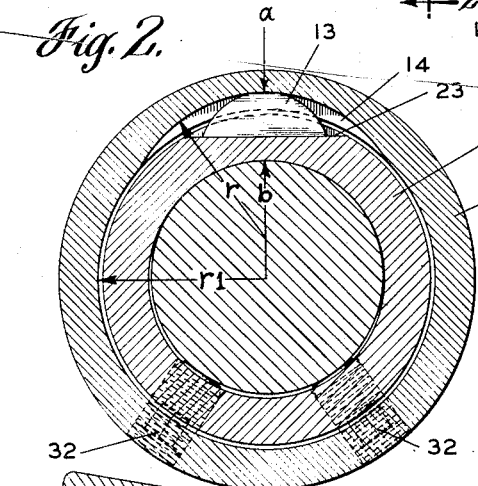
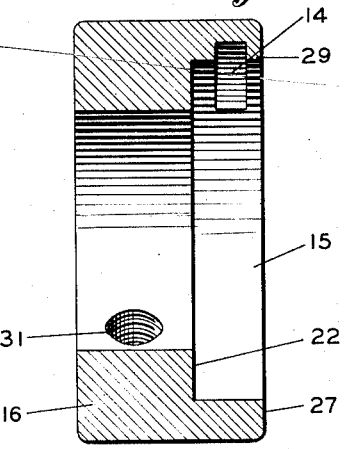
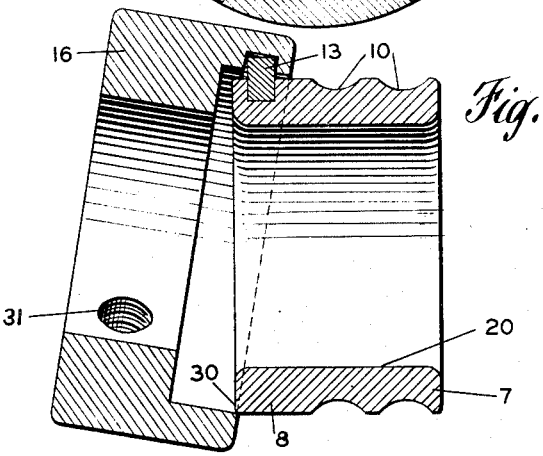
INVENTORS
Robert F. Runge
Eric C. Brodin
BY
THEIR ATTORNEY Patented Dec. 24, 1940

2,226,524

UNITED STATES PATENT OFFICE 2,226,524

MEANS FOR SECURING A BEARING TO A SHAFT

Robert F. Runge, Philadelphia, and Eric C. Brodin, Jenkintown, Pa., assignors to S K F Industries, Inc., Philadelphia, Pa., a corporation of Delaware Application November 21, 1939, Serial No. 305,418

3 Claims. (Cl. 287—52.09)

This invention relates to means for securing parts together and to means for securing a ring in position on a shaft and more particularly to securing a bearing ring in proper position on a shaft.

In assembling rings together and especially when these rings are mounted on a shaft, difficulty is often experienced in that the locking devices do not quickly grasp one another, and if these are mounted on a shaft when they are turned in opposite directions. Especially is this so if the device has been locked by movement in one direction and it is desired to lock it by movement in the opposite direction, considerable slippage is apt to take place. It has also been found that it is difficult to provide a ring, as for instance a bearing ring, with a mounting device the parts of which, when having been placed in proper position, will stay that way whether mounted upon a shaft or not.

To effect convenient assembly, bearings and other parts are sometimes made with the inside diameter larger than the shaft diameter. Our invention is a device for locking the inner race of such bearings to a rotating shaft. The device locks the bearing against rotation on the shaft and against axial motion on the shaft. This locking is accomplished without the usual flanges, holes, flats, or any other departures from a plain cylindrical shaft; nor is interference fit used between any part and the shaft.

In the drawing accompanying and forming part of this application, one practicable embodiment of our invention is illustrated in which drawing Figure 1 shows in section a form of the device mounted on a short length of shaft.

Figure 2 is a section taken at about the line 2—2 of Figure 1 looking in the direction of the arrow.

Figure 3 is a section of the locking member removed.

Figure 4 is a face view of the loon, or locking cam, and

Figure 5 is a sectional view of two rings and the loon during the locking movement.

In the accompanying drawing the part to be locked is illustrated as a self aligning ball bearing 7, but may be any other type of plain or anti friction bearing. The part used to accomplish the locking is a well known set collar 16 held to the shaft by screws 32. The method used to lock the bearing 7 to the set collar 16 and in turn to a rotating shaft 28 constitutes our invention and is described as follows:

Axial locking is accomplished by the use of the intermediate part 13 between part 16 and part 7; this part 13 having been placed in a keyway 23 of part 7. In this case we have chosen to call this part 13, it may be a cam, a loon, and it and the keyway are parallel with the end of the ring. This part may be held in the groove by one or more hammer blows applied to the outer portion 23 of the side of the groove. The assembly of 16 and 7 is accomplished as shown in Figure 5 and will, after mounting of the unit on a shaft, axially lock together bearing 7 and collar 16. The collar 16 has formed in it a cam groove 14 parallel with its end.

Rotational locking is accomplished by the utilization of the well known mechanical phenomenon known as rolling, whereby a bearing having a bore larger than the shaft and subjected to one-directional load will rotate slower than the shaft itself, if left free to do so. By making the radius $r$ in groove 14 housing part 13 smaller than radius $r_1$ of bore 15, only a limited rotation of bearing 7 on shaft 28 can take place before the crest of part 13 will lock against the bottom of groove 14 and since the phenomenon of rolling, that is the efforts of part 7 to creep around the shaft 28 will continue as long as the bearing is loaded and rotated, and the locking will also be continuous and automatic. The continued efforts of part 7 to creep around shaft 28 while part 16 is locked, due to the wedge angle formed by the radius $r$ soon after rotation has begun, create a heavy tension between points $a$ and $b$. This continuous and heavy tension is locking part 7 to part 28. As the effort of rolling is proportionate to the bearing load, so is the effort of locking proportionate to the effort of rolling and the wedge angle formed by radius $r$.

Since the surfaces of locking are small the gyratory motion of part 7 will not loosen the screws holding the collar 16 to the shaft.

By proper dimensioning of bore 15 in relation to the distance between the crest of part 13 and the corner 30 of part 7, an interference fit is established at that point of assembly as shown in Figure 5. This makes the parts 7 and 16 self contained and they, when properly placed together, will under normal handling not become separated before being mounted on a shaft.

Although but one form of our invention has been shown in the drawing, yet it will be apparent that changes may be made within the scope of our claims without departing from the spirit of the invention.

Having thus described our invention, we claim and desire to secure by Letters Patent:

1. The combination with a shaft, of a ring round on its outer side and mounted on the shaft and carrying on its outer side parallel with its end and projecting beyond its said outer side and an outwardly directed loon or cam, a second ring also mounted on the shaft and having approximately the bore of the first mentioned ring and having a round part for overlying the part of the said first mentioned ring which carries the loon or cam, there being formed in the inner surface of its overlying part a cam groove parallel with its end, and of much less radius than the radius of such part for receiving and acting upon the said loon or cam.

2. The combination with a shaft, of a ring round on the outside and mounted on the shaft and having upon its outer side and parallel with and projecting beyond its end a loon or cam facing in both directions, a second ring also mounted on a shaft and having approximately the bore of the first mentioned ring and having a round part for overlying a part of the said first mentioned ring, said overlying part being of almost the same inside diameter as said outer side of the first mentioned ring whereby one snaps into the other, there being formed in the inner surface of its overlying part a cam groove facing in both directions and disposed parallel with the end of the ring, it being of much less radius than the radius of such part for receiving and acting upon the said loon or cam.

3. The combination with a ring adapted to be mounted on a shaft and having its outer side round and having parallel with and projecting beyond its said outer side a loon or cam, of a second ring adapted to be mounted on the same shaft and having a rounded part for overlying the round part of the said first mentioned ring, said overlying part being of almost the same diameter as the said outer side of the first mentioned ring, there being formed in the inner surface of the overlying part a cam groove of much less radius than the radius of such part facing in both directions and disposed parallel with the end of the ring for receiving and acting upon the said loon or cam for locking said rings on said shaft and for holding them in their assembly before being mounted on the shaft.

ERIC C. BRODIN.
ROBERT F. RUNGE.